United States Patent [19]

Bunce

[11] Patent Number: 4,512,302

[45] Date of Patent: Apr. 23, 1985

[54] ROTARY ENGINE

[76] Inventor: Earl G. Bunce, 223-1 Queensbury Dr., Huntsville, Ala. 35802

[21] Appl. No.: 510,654

[22] Filed: Jul. 5, 1983

[51] Int. Cl.³ .............................................. F02B 53/08
[52] U.S. Cl. .................................... 123/238; 418/196; 418/10; 418/183
[58] Field of Search .................... 123/238, 235, 249; 418/196, 227

[56] References Cited

U.S. PATENT DOCUMENTS 3,699,930  10/1972  Bunce .................................. 123/235
4,057,035  11/1977  Su ......................................... 418/227

FOREIGN PATENT DOCUMENTS 585811   3/1925  France ................................. 418/196
55-60682 5/1980  Japan .................................. 418/191

Primary Examiner—Michael Koczo
Assistant Examiner—John J. McGlew, Jr.
Attorney, Agent, or Firm—C. A. Phillips; Michael L. Hoelter

[57] ABSTRACT

A rotary internal combustion engine having separately housed compression and power rotors, and wherein there is a pair of sealing rotors positioned adjacent to diametrically opposite peripheral edges of each rotor to form two sealed pressure chambers in each housing.

1 Claim, 8 Drawing Figures

4,512,302

ROTARY ENGINE

TECHNICAL FIELD

This invention relates to rotary power conversion structures as exemplified by a rotary engine.

BACKGROUND ART

One problem encountered in the construction of rotary power conversion devices which either or both compress and/or are rotated by compression is that of undesirable leakage around rotors typically employed. The applicant's U.S. Pat. No. 3,699,930 provides an improved structure, and the present application provides still further improvement.

SUMMARY OF THE INVENTION

In accordance with this invention, there is described separate compressor and power assemblies, with each assembly having rotating rotors that have similarly configured lobes and notches. Each lobe in each assembly has an outermost or top convex surface and a pair of opposite, like convex side walls. Each notch in each assembly has a bottom or innermost convex surface and a pair of opposite, like side wall surfaces. Additionally, the diameter of the lobed compressor rotor and the lobed power impulse rotor is three-halves the diameter of their respective notched sealing rotors positioned within the separate compressor and power assemblies.

DETAILED DESCRIPTION OF THE PREFERRED EMBODIMENT

Figure 1:
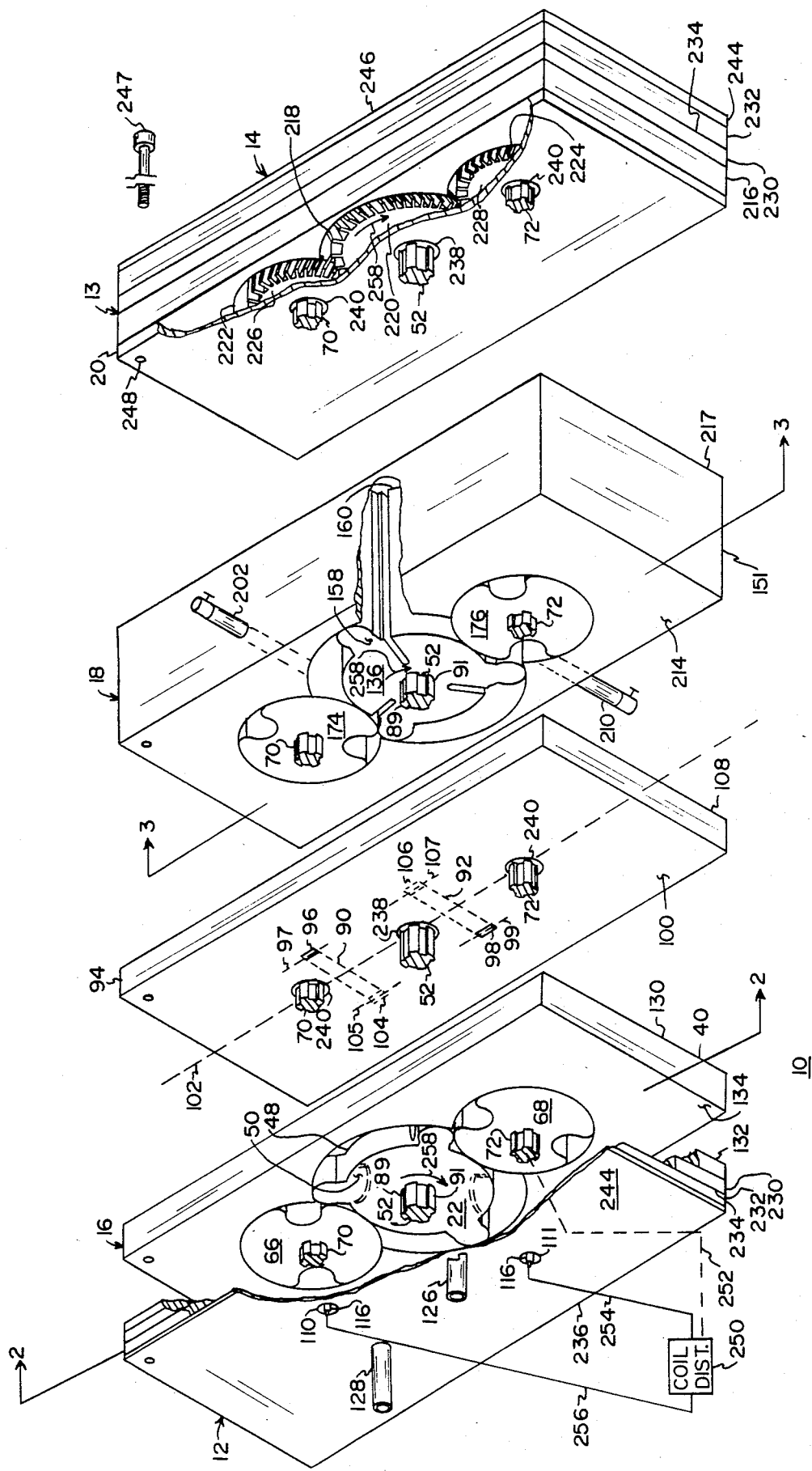
FIG. 1 is a perspective view, partly cut away, of an embodiment of the invention with various assemblies of the invention separated for clarity.
Figure 2:
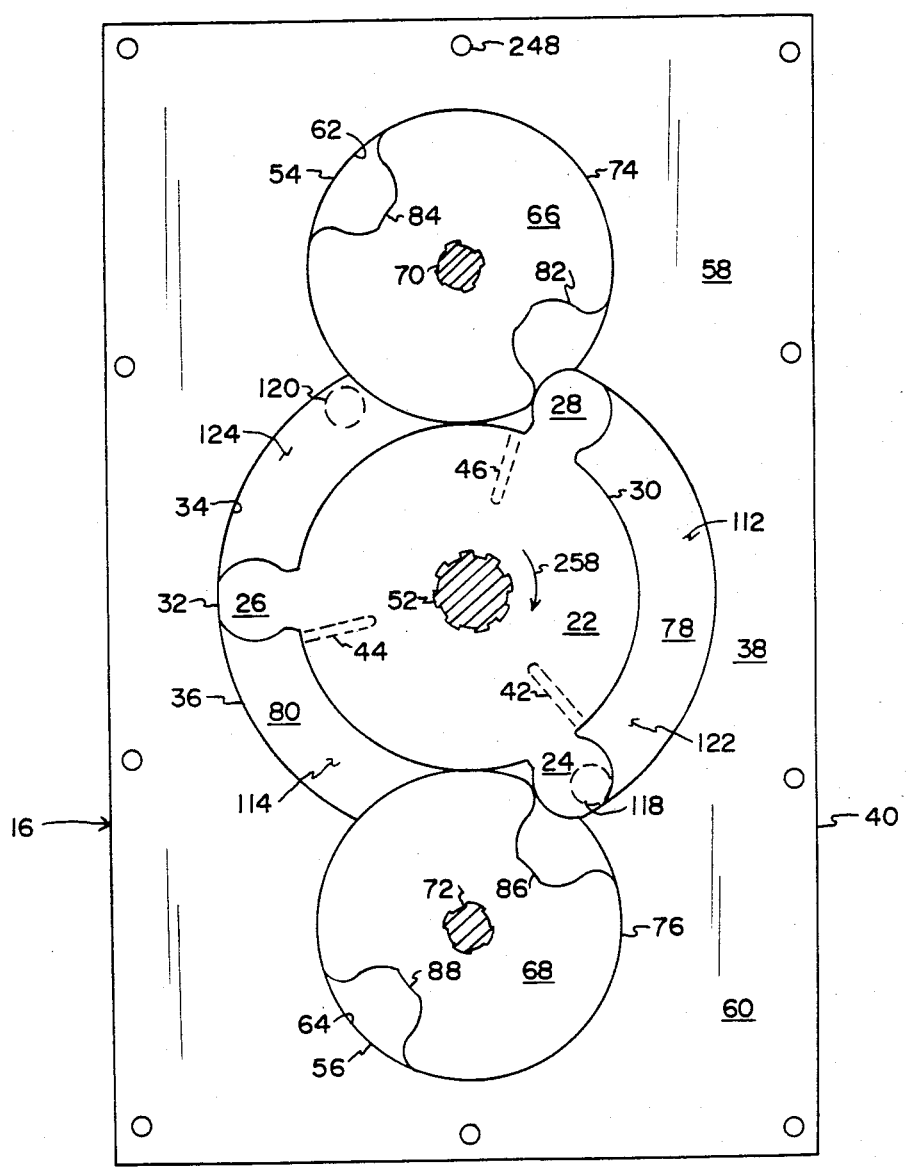
FIG. 2 is a planar view of the power assembly.

Referring to the drawings, there is shown in FIG. 1 an embodiment of the invention which is separated into six separate assemblies for purposes of description and is illustrative of the sectionalized construction. There is an end support assembly 12, two spacer plates 20 and 94, and three engine function assemblies designated as timing assembly 14, power assembly 16, and compressor assembly 18. Timing gear assembly 14 comprises the other end support assembly 13. These assemblies, taken as a group, will hereinafter be designated as rotary engine 10. Referring also to FIG. 2, power assembly 16 includes annular power rotor 22 having three transverse symmetrically spaced lobes or lugs 24, 26, and 28 formed about outer periphery 30 which are configured having top land surfaces 32 contoured to provide a sealing contact with inner surface 34 of circular cylindrical cavity 36 formed within the central annular portion 38 of housing 40.

Inlet slots 42, 44, and 46, centrally positioned 10° counterclockwise from lobes 24, 26, and 28, respectively, are milled into outer periphery 30 of rotor 22, using a circular milling cutter of sufficient width and diameter to form a circular quarter section as shown. Inlet slots 42, 44, and 46 extend transversely from edge 48 and substantially to edge 50 of rotor 22 which is secured to splined main shaft 52. Cylindrical cavities 54 and 56, formed in upper portion 58 and lower portion 60 of housing 40, open into central cavity 36 and have inner circumferences 62 and 64 tangent to outer periphery 30 of rotor 22. Annular upper and lower sealing rotors 66 and 68, which are dimensioned to closely and rotably fit cavities 54 and 56 are secured to upper and lower sealing rotor spline shafts 70 and 72, respectively. Rotors 66 and 68 include outer peripheries 74 and 76 which are in sealing contact with power rotor 22, thus preventing communication between two firing chambers 78 and 80 within housing 40.

Spaced notches 82 and 84 cut into periphery 74 of upper rotor 66 and like placed notches 86 and 88 cut into periphery 76 of lower rotor 68 are configured to mesh with lobes 24, 26, and 28 of rotor 22.

Referring once again to FIG. 1, there are two diametrically opposed inlet ports 90 and 92 formed in spacer plate 94 having openings 96 and 98 on side 100 of plate 94. These openings 96 and 98 are dimensioned and oriented to communicate with slots 42, 44, and 46 of rotor 22 and are between 10° and 40° in width. They are centered about lines 97 and 99, respectively, which are at a peripheral angle of 10° to 40° from vertical center line 102. Openings 96 and 98 are positioned inward with respect to outer periphery 30 of rotor 22 and are positioned on opposite sides 89 and 91 of main shaft 52 so that they are open only when in alignment with inlet slots 42, 44, and 46 of rotor 22. Inlet ports 90 and 92 extend angularly through spacer plate 94 and have like positioned openings 104 and 106 on compressor side 108 of plate 94. Openings 104 and 106 are between 10° and 40° in width and are centered about lines 105 and 107, respectively, which are at a peripheral angle of 10° to 40° from vertical center line 102.

Threaded aperture 110 and a like aperture 111 extend into end areas 112 and 114 of firing chambers 78 and 80, respectively. These apertures 110 and 111 are drilled through end support assembly 12 and are adapted to accept spark plugs 116. End assembly 12 may also be drilled and tapped for fuel injection by means not shown. Exhaust ports 118 and 120 are provided in opposite ends 122 and 124 of firing chambers 78 and 80, respectively. Those exhaust ports 118 and 120 extend outwardly through end assembly 12, parallel to and spaced from threaded apertures 110 and 111, and are fitted to exhaust manifolds 126 and 128, respectively. Spacer plate 94, when assembled, provides a gas-tight seal for side 130 of housing section 40. Spacer plate 132 provides a similar seal for side 134 of housing 40 when assembled.

Figure 3:
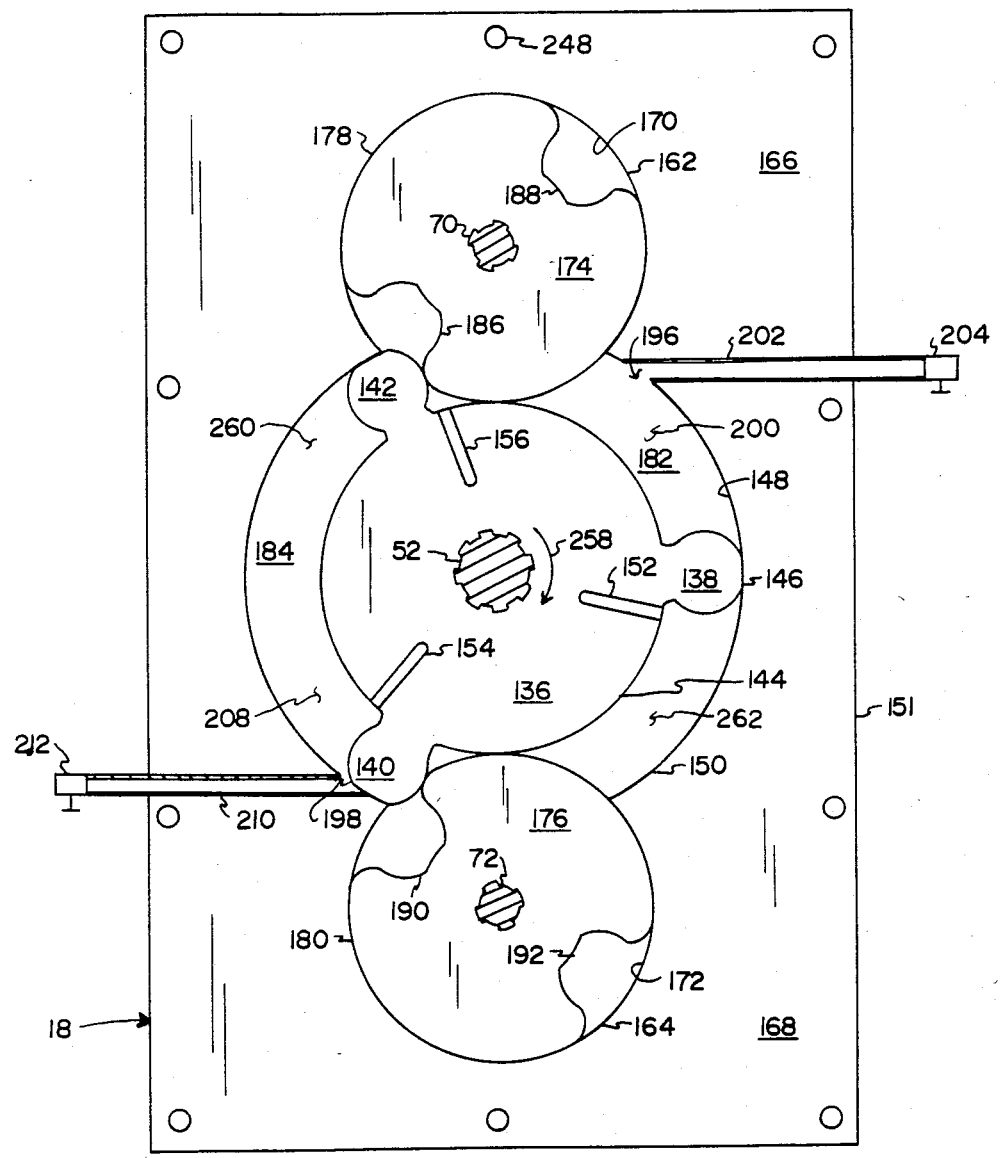
FIG. 3 is a planar view of the compression assembly.

Referring additionally to FIG. 3, compressor assembly 18 includes annular compression rotor 136 having approximately four times the width dimension of power rotor 22, but of like diameter, and including three transverse symmetrically spaced lobes 138, 140, and 142 formed about outer periphery 144. Lobes 138, 140, and 142 are configured having top land surfaces 146 contoured to provide a sealing contact with inner surface 148 of circular cylindrical cavity 150 formed in central annular portion of housing 151. Transverse fuel outlet slots 152, 154, and 156 are milled into outer periphery 144 of rotor 136 using a circular milling cutter of sufficient width and diameter to form a circular quarter sector as shown. Slots 152, 154, and 156 are centrally positioned approximately 10° clockwise with respect to lobes 138, 140, and 142, respectively, and extend transversely from edge 158 and substantially to opposite edge 160. Compression rotor 136 is secured to splined main shaft 52 such that outlet slots 152, 154, and 156 are positioned 40° counterclockwise with respect to inlet slots 42, 44, and 46 of power rotor 22.

Cylindrical cavities 162 and 164, formed in upper and lower portions 166 and 168, respectively, of housing 151, open into central cylindrical cavity 150 and have inner circumferences 170 and 172 tangent to outer periphery 144 of rotor 136. Annular upper and lower sealing rotors 174 and 176 are dimensioned to closely and rotably fit areas 162 and 164, respectively, and have outer peripheries 178 and 180 in sealing contact with rotor 136 in order to prevent communication between compression chambers 182 and 184. Spaced notches 186 and 188 cut in outer periphery 178 of upper sealing rotor 174 are configured to mesh with lobes 138, 140, and 142 of rotor 136 when sealing rotor 174 is secured to splined upper shaft 70. Like configured notches 190 and 192 are cut in outer periphery 180 of lower sealing rotor 176 which mesh with lobes 138, 140, and 142 on compression rotor 136 when sealing rotor 176 is secured to splined lower shaft 72.

Fuel intake ports 196 and 198 are formed in upper and lower portions 166 and 168, respectively, of housing section 151. Upper intake port 196 extends into end region 200 of compression chamber 182 and is adapted to accept intake manifold 202 fitted with carburetor 204. Lower intake port 198 extends into end region 208 of compression chamber 184 and is adapted to accept intake manifold 210 fitted with a second carburetor 212, or as previously mentioned, housing 151 may be configured to accept a fuel injector assembly (not shown). Spacer plate 94 provides a gas-tight seal for side 214 of housing 151 when engine 10 is assembled. Also, as previously mentioned, openings 104 and 106 of inlet ports 90 and 92 are dimensioned and oriented to communicate with outlet slots 152, 154, and 156 of rotor 136. These openings 104 and 106 are centered about points 105 and 107 and are at a peripheral angle of 10° to 40° from central vertical plane 102. Openings 104 and 106 are positioned inward with respect to periphery 144 of rotor 136 and are positioned on opposite sides 89 and 91 of main shaft 52 such that fuel transfer is enabled only when they are in alignment with slots 152, 154, or 156. Spacer plate 20 provides a gas-tight seal for side 217 of compressor housing 151 when assembled.

Timing assembly 14 includes housing member 216 having central annular opening 218 adapted to enclose main timing gear 220, which is secured to splined main shaft 52. Annular upper and lower openings 222 and 224, respectively, which interconnect with central annular opening 218, are adapted to accept upper and lower timing gears 226 and 228, respectively, which are secured to splined upper and lower sealing rotor shafts 70 and 72, respectively. Upper and lower timing gears 226 and 228 are in turn engaged with centrally located timing gear 220 such that notches 82 and 84 of upper sealing rotor 66 and notches 86 and 88 of lower sealing rotor 68 mesh with lobes 24, 26, and 28 of power rotor 22. The gear ratio between timing gear 220 and upper and lower gears 226 and 228 is such that for every revolution of timing gear 220, upper and lower gears 226 and 228 complete one and a half revolutions.

End support assemblies 12 and 13 are shown as assembled, and each includes a ball bearing support plate 230, retainer plate 232, and cover plate 244. Each end support plate 230 is equipped with ball bearings (not shown) which are adapted to journal upper and lower sealing rotor shafts 70 and 72 and main shaft 52. Each bearing retainer plate 232, when assembled to side 234 of bearing support plate 230, is adapted to prevent axial shift of splined main shaft 52 and sealing rotor shafts 70 and 72 toward end 236 or 246 of engine 10. End cover plate 244 is assembled to bearing retainer plate 232 and prevents internal lubricant or gases from escaping rotary engine 10. Main shaft support bearings 238 and sealing rotor shaft support bearings 240, installed in spacer plates 94 and 20, are of conventional design and are adapted to closely fit bearing collars (not shown) of main shaft 52 and sealing rotor shafts 70 and 72, respectively. Support bearings 238 and 240 in spacer plate 94 provide a gas-tight seal between power assembly 16 and compressor assembly 18. Bearings 238 and 240 of spacer plate 20 provide a seal between compressor assembly 18 and timing assembly 14. Like bearings (not shown) in spacer plate 132 prevent leakage into end assembly 12 from power assembly 16. When separate assemblies 12, 14, 16, and 18 and spacer plates 20 and 94 are mated together, they are typically maintained in a gas-tight relationship by an O ring compression gasket and by a plurality of bolts 247 which extend through in-line holes 248 provided in each assembly. Conventional coil-distributor assembly 250, mechanically coupled to lower sealing rotor shaft 72 (by means not shown, but represented by line 252) provides timed electrical impulses through spark plug wires 254 and 256 for ignition or fuel injection.

In operation, rotary engine 10 actually produces six power impulses for each revolution of main engine shaft 52. For purposes of explanation, only one of these events will be initially described. The normal direction of rotation of main shaft 52 is clockwise as indicated by arrows 258. Each sealing rotor shaft 70 and 72 thus rotates counterclockwise as determined by timing gears 226 and 228. With reference to compressor assembly 18, assume that lobe 140 on compression rotor 136 has just passed lower sealing rotor 176. As lobe 140 sweeps clockwise across lower intake port 198, fuel from carburetor 212 is drawn into compression chamber 184. As lobe 140 approaches upper sealing rotor 174, compression chamber 184 is charged with fuel. The following lobe 138 passes lower rotor 176 and sweeps through compression chamber 184, which has just been charged with fuel, thus compressing it in upper end region 260 of compression chamber 184. As outlet slot 152 of rotor 136 transverses opening 104 of inlet port 90, fuel, under pressure, is supplied to firing chamber 78 of power assembly 16.

Fuel flows through inlet port 90, and inlet slot 42 of power rotor 22 has now rotated to an aligned position with respect to opening 96 of inlet port 90. As rotation continues, slot 42 of power rotor 22 passes beyond opening 96. This action closes inlet port 90, after which a timed electrical impulse from coil-distributor assembly 250 through wire 256 fires spark plug 116, and expanding fuel applies pressure between upper sealing rotor 66 and lobe 24 of power rotor 22, turning rotor 22 in a clockwise direction. As lobe 24 sweeps through firing chamber 78, it scavenges unburned gases from firing chamber 78 left there from a previous firing. Since compression chamber 182 is identical to chamber 184 when lobe 138, 140, or 142 passes upper sealing rotor 174, fuel is drawn into chamber 182, as it was into opposite chamber 184, through intake manifold 202. During this same time, fuel is being compressed in lower region 262 of compression chamber 182. As one of slots 152, 154, or 156 reaches an aligned position with respect to opening 106 within compression chamber 182, fuel under pressure passes through a second inlet port 92 in a like manner as described above to a second firing chamber 80 of power assembly 16, which is identical to firing chamber 78, and thus a second power impulse is generated in firing chamber 80. There being three lobes 138, 140, and 142 sweeping through each of two compression chambers 182 and 184 during any one revolution of rotor 136, six intake compression events occur for each such revolution of rotor 136. Also, since at the end of each compression cycle fuel is transferred to one of two firing chambers 78 or 80 in power assembly 16, and the relative motions of rotors 136 and 22 are synchronized, it follows that six power impulses occur during each revolution of power rotor 22, thus imparting smooth power to splined main shaft 52.

Additionally, compressor assembly 18 functions as a rotary pump when the fluid drawn in by intake ports 196 and 198 is liquid. This rotary pump pressurizes the liquid drawn into compression chambers 182 and 184 as lobes 138, 140, and 142 sweep through compression chambers 183 and 184. Pressurized liquid is then discharged via ports 90 and 92 and transferred elsewhere.

Compressor assembly 18 may also be converted for use as a two-stage pressurized air or steam motor by enlarging the bore of the passageway between the main engine assembly of this two-stage apparatus and the compressor assembly. Also, with an appropriate high compression structure and a fuel injection system, rotary engine 10 may be fueled by diesel fuel.

The interrelationship between numerous variables determine the cubic displacement and horsepower rating of rotary engine 10. Once the power requirement desired of engine 10 is known (e.g., 5 horsepower, 10 horsepower, etc.), a number of these variables will also have been determined. At least three variables, though, will not have been selected because the combination of different values of these three variables, according to certain interrelationships, will result in rotary engine 10 having the same cubic displacement and horsepower rating. Thus, besides selecting a desired power requirement, these three variables must also be selected before rotary engine 10 can be manufactured. These three variables determine the volume of the compression and firing chambers previously described, and more particularly, the shape and configuration of the lobes and notches in each of the power and compressor assemblies.

Figure 5:
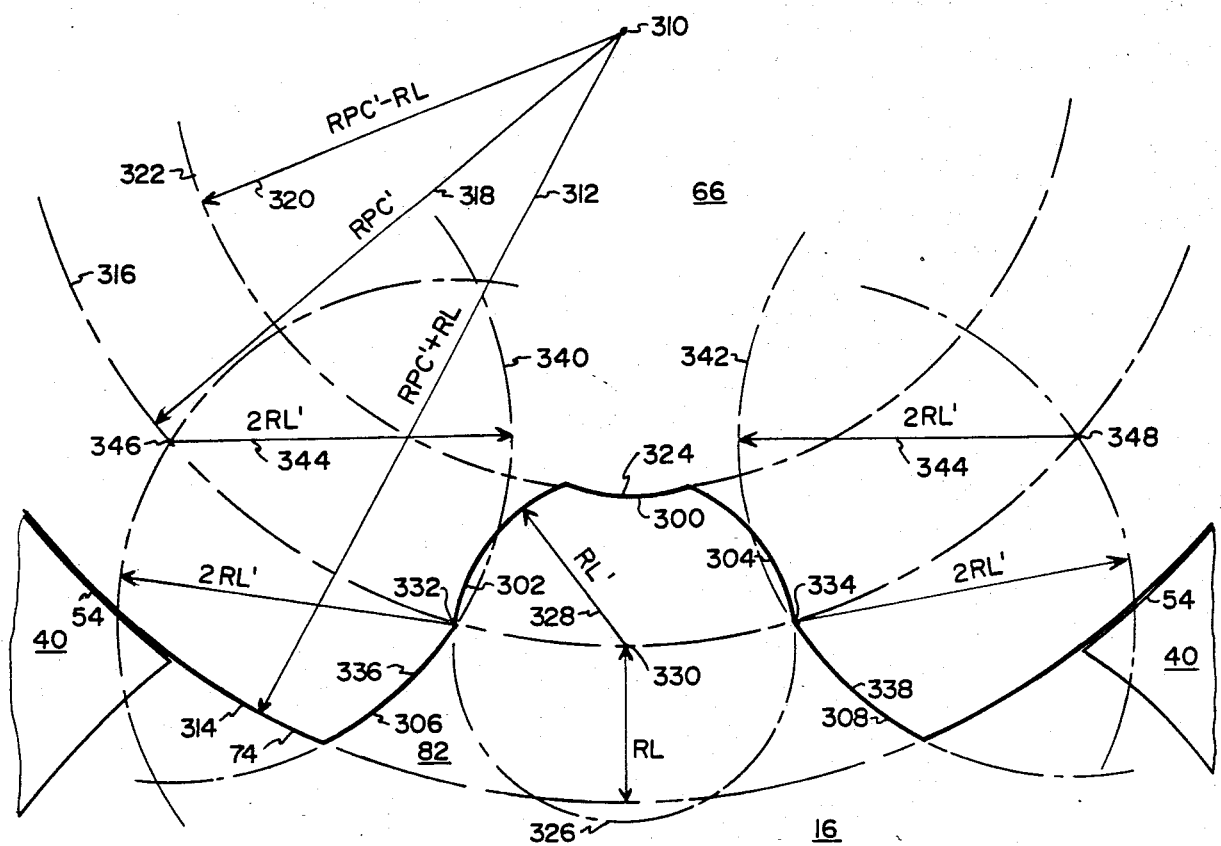
FIG. 5 is a diagrammatic view, partly cut away, of the configuration of a sealing rotor notch.

The first of these variables to be selected is the radius of the pitch circle (RPC) for power rotor 22 and compression rotor 136. This value, RPC, is identical for both rotor 22 and 136. As shown in FIG. 5, RPC is the radius of a circle which extends midway through the compression and firing chambers. The selection of this value, RPC, automatically determines the value RPC', which is the radius of the pitch circle for each of the sealing rotors 66, 68, 174, and 176. This is due to the fact that RPC' is equal to ⅔ RPC or, in other words, there is a 3:2 ratio between the radii of the pitch circle of each of sealing rotors 66, 68, 174, and 176 (RPC') and the radii of the pitch circle of their respective adjacent rotor 22 or 136 (RPC).

The second variable to be selected is one-half the height of the lobe (RL) for each of power assembly 16 and compressor assembly 18. This value must remain the same for each of the three lobes on an individual rotor, but this value may vary from one rotor to the next. Thus, the height of the individual lobes 24, 26, and 28 on power rotor 22 are identical, but this height value may be different from that for lobes 138, 140, and 142 on compression rotor 26. Obviously, for structural considerations, one-half the height of the lobe, RL, cannot exceed the radius of the pitch circle RPC for rotors 22 and 136.

The third and last variable to be selected before rotary engine 10 can be manufactured is the length of the lobes and notches within this engine. The length of each of the power and compressor assemblies 16 and 18 generally vary, with compressor assembly 18 usually being greater than twice the length of power assembly 16.

Figure 4:
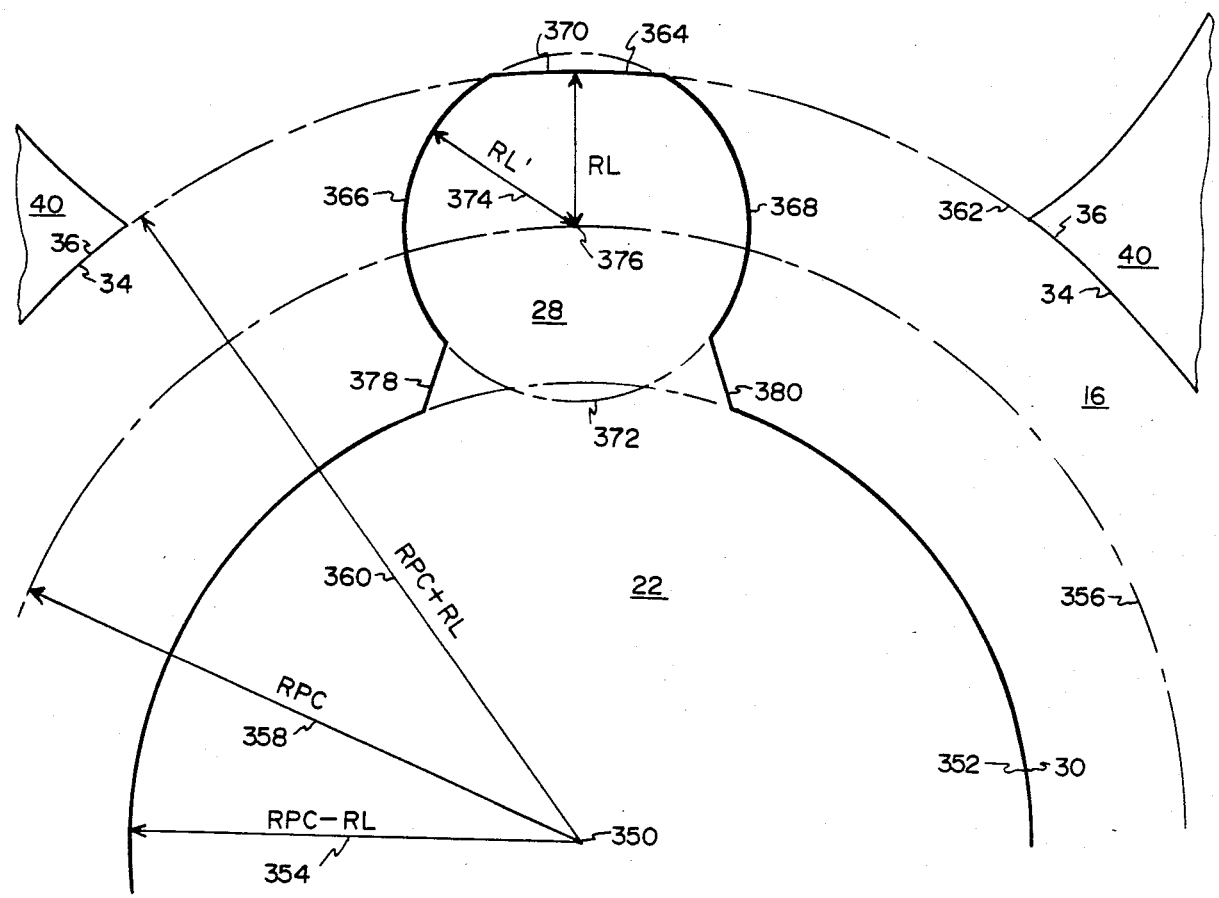
FIG. 4 is a diagrammatic view, partly cut away, of the configuration of a central rotor lobe.

Referring now to FIGS. 4 and 5, there is illustrated a diagrammatic view of the curved surfaces of a typical lobe and notch, respectively. These curved surfaces are determined as shown from the above values RPC, RPC', and RL.

Referring now to FIG. 4, there is shown lobe 28 on power rotor 22 which has a center point 350 and an inner circle 352 having a radius 354 whose length is equal to the difference of RPC minus RL. Inner circle 352 defines periphery 30 of rotor 22. Pitch circle 356 of rotor 22 is centered on point 350 and has a radius 358 which is equal to the value of RPC. Outer radius 360, equal to the sum of RPC plus RL, defines outer circle 362 which also has its center at point 350.

Lobe 28 on power rotor 22 is configured having an outer convex surface 364 and a pair of symmetrical convex side walls 366 and 368. Outer convex surface 364 of lobe 28 defines arc 370 on outer circle 362. This arc 370 extends along outer circle 362 between the intersection of outer circle 362 with each of symmetrical convex side walls 366 and 368.

Lobe side walls 366 and 368 form separate portions of the circumference of a smaller circle 372. Smaller circle 372 has a radius 374 equal to the value of RL times a multiplier MP, with multiplier MP having a range between 1 1/16 and 1¾. This new value, RL times MP, which defines smaller circle 372, is labelled RL', and smaller circle 372 is centered at point 376 which is on pitch circle 356. Lobe side walls 366 and 368 extend along smaller circle 372 between the intersection of this circle 372 with opposite lobe supports 378 and 380 along periphery 30 of rotor 22.

All of the lobes on power rotor 22 are identically configured. The lobes on compression rotor 136 are configured in a similar manner, taking into account the possible variation in the value of RL between power rotor 22 and compression rotor 136. Inner surface 34 of cylindrical cavity 36 in housing 40 of power assembly 16 is machined to insure a running fit between moving and non-moving components. The amount that inner surface 34 of housing 40 is machined is generally 0.002 inch, but the actual amount may vary.

Referring now to FIG. 5, there is illustrated notch 82 in outer periphery 74 of upper sealing rotor 66 in power assembly 16. Notch 82 is configured having an inner convex surface 300, a first pair of symmetrical concave side walls 302 and 304, and a second pair of symmetrical convex side walls 306 and 308. The curvatures of these surfaces are dependent upon the values chosen for RPC and RL, with the value RPC' being determined from the 3:2 ratio with RPC as previously discussed.

Sealing rotor 66 has center point 310 and an outer radius 312 equal to the sum of RPC' plus RL which defines outer circle 314 and outer periphery 74 of rotor 66. Pitch circle 316 of sealing rotor 66 has a center point 310 and a radius 318 which is equal to the quantity RPC'. Inner radius 320, equal to the difference of RPC' minus RL, defines inner circle 322 which is also centered at point 310.

Inner convex surface 300 of notch 82 defines an arc 324 on inner circle 322. This arc 324 extends along inner circle 322 between the intersection of circle 322 with each of the first pair of symmetrical concave side walls 302 and 304. This first pair of notch side walls 302 and 304 form portions of the circumference of a smaller circle 326 which has a radius 328 equal to the value of RL times a multiplier MP, with multiplier MP having a range between 1 1/16 and 1¾. This new value, RL times MP, which defines smaller circle 326, is labeled RL', and smaller circle 326 has its center point 330 located on pitch circle 316. Smaller circle 326 is similar to smaller circle 372, as described for FIG. 4. Each of first pair of side walls 302 and 304 of notch 82 extends along smaller circle 326 between the intersections of this circle 326 with inner circle 322 and pitch circle 316. The intersections between smaller circle 326 and pitch circle 316 are labeled points 332 and 334, respectively. As previously mentioned, inner convex surface 300 is defined by arc 324 which extends along inner circle 322 between the intersection of smaller circle 326 with inner circle 322.

Second pair of symmetrical notch side walls 306 and 308 intersect with first pair of side walls 302 and 304 at points 332 and 334, respectively. This second pair of side walls 306 and 308 define arcs 336 and 338, respectively, on separate fourth and fifth circles 340 and 342. Each of these circles 340 and 342 have a radii 344 which is equal to twice the value of RL', or twice the value of the multiplier MP times RL. Fourth and fifth circles 340 and 342 have centers 346 and 348 which are located on pitch circle 316 at a distance of twice the value of RL' from points 332 and 334, respectively, as shown in FIG. 5. Second pair of symmetrical side walls 306 and 308 extend from points 332 and 334 along arcs 336 338 on fourth and fifth circles 340 and 342, respectively, to the intersection with the outer periphery 74 of sealing rotor 66.

These surfaces outline a typical notch 82 in sealing rotor 66, and they are further machined to allow a running fit between notch 66 and a lobe of adjoining power rotor 22 (FIG. 4). The amount of additional machining of notch 82 is generally in the range between 0.001 to 0.002 inch. Any lesser amount would restrict the rotation of or bind sealing rotor 66, and any greater amount would essentially eliminate any effective sealing between sealing rotor 66 and power rotor 22. Cylindrical cavity 54 in housing 40 of power assembly 16 is also machined to insure a running fit between moving and non-moving components. The amount that cavity 54 is further machined is generally 0.002 inch, but the actual amount may vary.

Opposite notch 84 in sealing rotor 66 is configured identical to the above described notch 82, and both notches 86 and 88 in lower sealing rotor 68 in power assembly 16 are also identically configured as notch 82. The notches in each sealing rotor 174 and 176 of compressor assembly 18 are configured in a similar manner as notch 82, taking into account the possible variation in the value of RL, as previously discussed.

Figure 8:
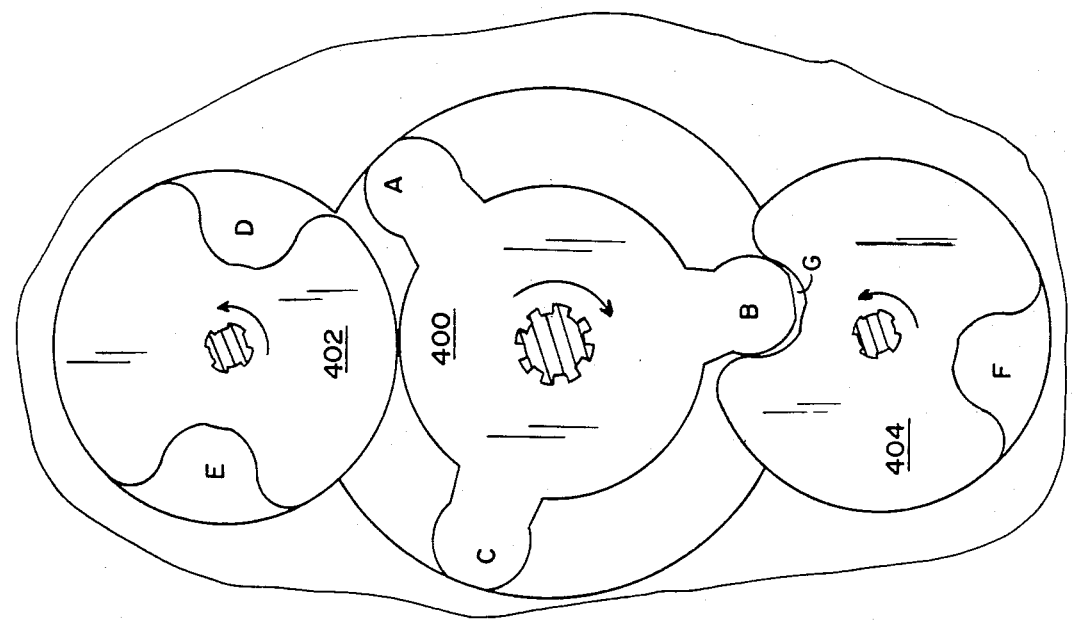
FIGS. 6-8 are diagrammatic views, partly cut away, showing the various positions of the notch and lobe as the rotary engine is rotated.
Figure 7:
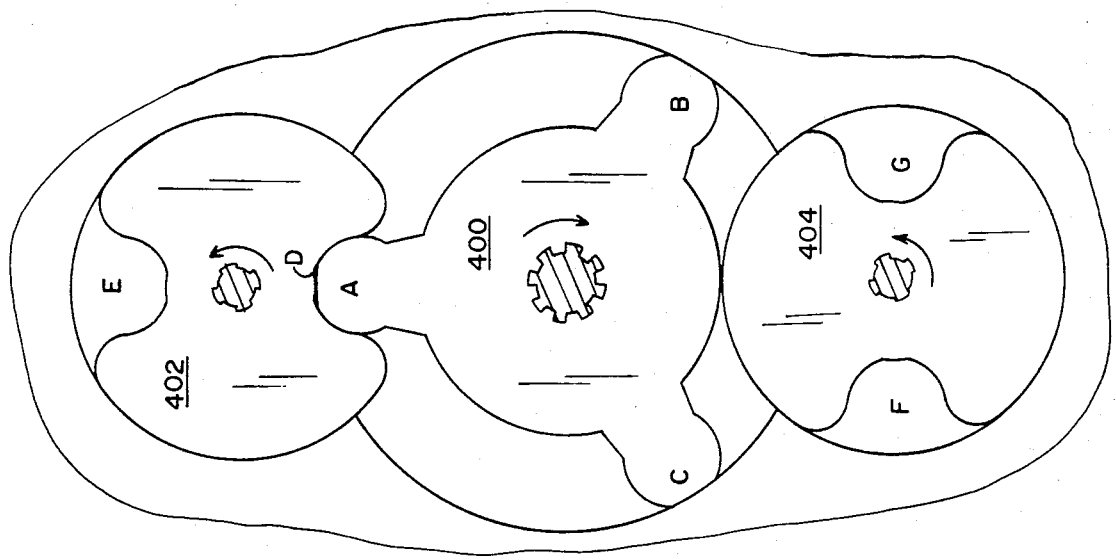
Figure 6:
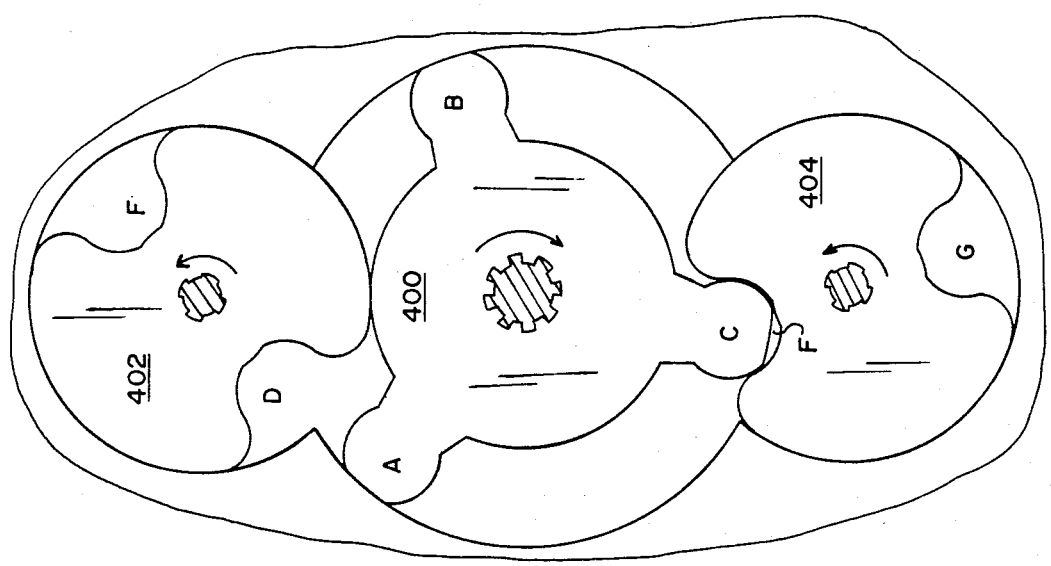

Referring now to FIGS. 6, 7, and 8 in conjunction with FIGS. 1, 2, and 3, there is shown diagrammatically a central rotor 400 having lobes A, B, and C and upper and lower sealing rotors 402 and 404 having corresponding notches D, E, F and G.

For purposes of illustrating the operation of rotary engine 10, assume that FIGS. 6, 7 and 8 illustrate compressor assembly 18 showing compression rotor 136 and upper and lower sealing rotors 174 and 176. As shown in FIG. 6, lobe A is in a position at the completion of its compression cycle. The fuel that was compressed between lobe A and upper sealing rotor 402 is being transferred via lobe A's adjacent slot and port 90 to firing chamber 78 of power assembly 16. The trailing surface of lobe A is drawing an air/fuel mixture into compression chamber 184 via lower intake port 198. Lobe B, as it moves clockwise, draws an air/fuel mixture behind it through upper intake port 196 into compression chamber 182. The fuel that was previously drawn into compression chamber 182 by lobe C as it swept through compression chamber 182 is being compressed between the leading surface of lobe B and lower sealing rotor 404.

Referring now to FIG. 7, lobe A is shown positioned within notch D in upper sealing rotor 402. The trailing surface of lobe B is still drawing an air/fuel mixture behind it into compression chamber 182 wile the leading surface of lobe B has completed its compression stroke and is transferring this compressed fuel to firing chamber 80 via lobe B's adjacent slot and port 92. Lobe C has a leading surface which is compressing the air/fuel mixture drawn into compression chamber 184 by lobe A when it swept through compression chamber 184. This fuel is being compressed between the leading surface of lobe C and upper sealing rotor 402 while the trailing surface of lobe C is drawing an air/fuel mixture into compression chamber 184 from lower intake port 198.

Referring now to FIG. 8, lobe A is in a position blocking intake port 196 and preventing any more fuel from being drawn through intake manifold 202 into compression chamber 182 by lobe B. The leading surface of lobe A is now beginning to compress the fuel which lobe B had previously drawn into compression chamber 182. Lobe A will compress this fuel between its leading surface and lower sealing rotor 404. The trailing surface of lobe A will begin drawing an air/fuel mixture into compression chamber 182 just as soon as it passes across intake port 196 of intake manifold 202. Lobe B has completed transferring its compressed fuel to power assembly 16 and is beginning to engage a notch in lower sealing rotor 404. The leading surface of lobe C has completed its compression stroke and is transferring this compressed fuel to firing chamber 78 via port 90, while the trailing surface of lobe C is still drawing an air/fuel mixture into compression chamber 184.

Now, for purposes of further illustrating the operation of rotary engine 10, assume that FIGS. 6, 7 and 8 illustrate power assembly 16 showing power rotor 22 and upper and lower sealing rotors 66 and 68. As shown in FIG. 6, lobe A is in a position at the completion of its exhaust cycle wherein any exhaust gases remaining within firing chamber 80 were pushed out of this chamber through exhaust port 120 by the clockwise movement of lobe A. Lobe B is shown in a position wherein the compressed gases from compression chamber 184 have been transferred into firing chamber 78 of power assembly 16 behind the trailing surface of lobe B. A spark from coil distributor 250 via wire 256 will ignite this transferred fuel and propel lobe B clockwise. Lobe C is at a location prior to the transfer of compressed gases from compression chamber 182 into firing chamber 80.

Referring now to FIG. 7, lobe A is in a position between the completion of its exhaust cycle and the beginning of its intake cycle. Lobe B is at a position wherein the transfer of compressed gas to firing chamber 78 behind lobe B has been completed and a spark has ignited this compressed fuel, forcing lobe B to continue rotating clockwise. The leading edge of lobe B is exhausting the previously ignited fuel in firing chamber 78 out exhaust port 118. Lobe C is at a position wherein the compressed fuel from compression chamber 182 is being transferred into firing chamber 80 of power assembly 16 behind the trailing surface of lobe C. This transferred fuel will be ignited by a spark from coil distributor 250 via wire 254 to propel lobe C clockwise.

Referring now to FIG. 8, lobe A is shown during its intake cycle wherein compressed gas from compression chamber 184 is being transferred to firing chamber 78. A spark from coil distributor 250 via wire 256 will ignite the transferred fuel, propelling lobe A clockwise. The leading edge of lobe B, by its rotation clockwise, has completed its exhaust cycle and is engaging notch G in lower sealing rotor 404. Lobe C has had the gases behind its trailing edge ignited, and the leading edge of lobe C is exhausting the previously ignited gases in firing chamber 80 out exhaust port 120 similar to lobe A in FIG. 6.

To further illustrate the configuration of power rotor 22 within rotory engine 10, a fabricator would first select the radius of its pitch circle, RPC; one-half the height of the lobe desired, RL; and the length of the rotor. Once these values are determined, he would begin at center point 350 corresponding to the center of power rotor 22 and draw three circles from this center point having various radii (FIG. 4). The inner circle 352 would have a radius 354 whose length is equal to the difference of RPC minus RL. The middle or pitch circle 356 would have a radius 358 equal to the value of RPC. Thirdly, the outer circle 362 would have a radius 360 equal to the sum of RPC plus RL.

To construct one of the three lobes on power rotor 22, the fabricator would lay out, in addition to the above three circles (352, 356, and 362), a smaller circle 372 having its center 376 on pitch circle 356. The radius 374 of smaller circle 372 is equal to the product of RL times a multiplier, with the multiplier having a range between 1 1/16 to 1¾. This product, RL', defines smaller circle 372 which overlaps the three previously mentioned circles 352, 356, and 362. The intersection between smaller circle 372 and outer circle 362 defines arc 370 on outer circle 362. Arc 370 corresponds with the outer convex surface 364 or top land surface 32 of the lobe. Opposite lobe side walls 366 and 368 both define separate arcs on smaller circle 372, and these side walls 366 and 368 extend along the circumference of smaller circle 372 between its intersection with outer circle 362 and inner circle 352. Thus, a typical lobe is configured on power rotor 22 of rotary engine 10.

Referring now to FIG. 5, sealing rotor 66 is illustrated detailing the configuration of notch 82 in sealing rotor 66. As shown, the configuration of notch 82 is dependent, in part, upon three circles drawn around center point 310. Each of these circles are in turn dependent upon the value of ⅔ RPC, or as this value was previously labelled, RPC'. This value is dependent upon the radius of the pitch circle of power rotor 22 because of the 3:2 ratio between the radius of the pitch circle of the sealing rotors 66 and 68 (RPC') and the radius of the pitch circle of the power rotor 22 (RPC). Once RPC' is calculated, the three circles previously discussed can be drawn so as to outline notch 82 in sealing rotor 66. Thus, inner circle 322 is drawn having a radius 320 eqaul to the difference of RPC' minus RL. Pitch circle 316 is drawn with a radius 318 equal to the quantity of RPC', and outer circle 314 or periphery 74 of rotor 66 is drawn having a radius 312 equal to the sum of RPC' plus RL.

Notch 82 in sealing rotor 66 is configured of a variety of curves surfaces depending in part upon the three circles previously drawn around center point 310. Inner convex surface 300 defines arc 324 on inner circle 322 between the intersection of this circle and a smaller circle 326. This smaller circle 326 has a center point 330 which is on pitch circle 316. The radius 328 of smaller circle 326 is equal to the product of RL times a multiplier, with the multiplier having a range between 1 1/16 to 1¾. This value RL' defines smaller circle 326 which overlaps inner circle 322 of sealing rotor 66. Their overlapping defines arc 324 on inner circle 322 which corresponds with inner convex surface 300.

Each of first pair of side walls 302 and 304 of sealing rotor notch 82 define separate arcs on smaller circle 326. Each of these arcs begin at the intersection of smaller circle 326 with inner circle 322 and terminate at the intersection of smaller circle 326 with pitch circle 316. These termination points are labelled 332 and 334, respectively. The second pair of notch side walls 306 and 308 each define separate arcs 336 and 338 on separate circles having a radii equal to twice the value of HL' and which are also centered on pitch circle 316. These arcs 336 and 338 begin at points 332 and 334, respectively, and terminate at their intersection with outer periphery 74 of sealing rotor 66. Thus, one notch in power assembly 16 is defined in rotory engine 10. As previously mentioned, the notches in compressor assembly 18 are similarly configured.

For purposes of identifying references between the claims and the specification, rotor 174 is referred to as a first sealing rotor, rotor 176 is referred to as a second sealing rotor, rotor 66 is referred to as a third sealing rotor, rotor 68 is referred to as a fourth sealing rotor, rotor 136 is referred to as a compression rotor, and rotor 22 is referred to as a power impulse rotor.

The region between rotor 136 and housing 151 and between rotor 174 and rotor 176 is referred to as first compression chamber 182, and the region between rotor 136 and the other side of housing 151 and between rotor 174 and rotor 176 is referred to as second compression chamber 184.

Similarly, the region between housing 40 and rotor 22 and between sealing rotors 66 and 68 is referred to as first power chamber 78, and the region between power rotor 22 and housing 40 and between sealing rotors 66 and 68 is referred to as second power chamber 80.

Having thus described my invention, what is claimed is:

1. A rotary internal combustion engine comprising:
a centrally positioned main drive shaft and first and second auxiliary shafts, each said auxiliary shaft located parallel to and spaced a discrete distance from said main drive shaft;

a compression assembly comprising:
- a first housing including a first central chamber and first and second end chambers in opposite end regions of said first housing and opening into said first central chamber,
- a compression rotor mounted on said main shaft within said first central chamber and having a peripheral surface, said compression rotor including three equally spaced curved peripheral lugs making a sealing engagement with wall regions of said central chamber, and said compression rotor further including a like plurality of evenly spaced peripheral slots opening to one side and adjacent to the forward, with respect to the direction of rotation of said compression rotor, edge of each said lug,
- a first sealing rotor mounted on said first auxiliary shaft within said first end chamber and having an outer peripheral surface in sealing engagement with wall regions of said first end chamber, said first sealing rotor including two oppositely positioned slots, a said slot of said first sealing rotor being adapted to mesh with a said lug of said compression rotor,
- a second sealing rotor mounted on said second auxiliary shaft within said second end chamber and having an outer peripheral surface in sealing engagement with wall regions of said second end chamber, said second sealing rotor including two oppositely positioned slots, a said slot of said second sealing rotor being adapted to mesh with a said lug of said compression rotor, and
- a first compression chamber in said first central chamber formed between said first and second sealing rotors and between one side of said first housing and said compression rotor, and a second compression chamber formed in said first central chamber between said first and second sealing rotors and between the opposite side of said first housing and said compression rotor;

said slots of said first and second sealing rotors being configured of curved surfaces including a bottom or inner-most convex surface and a pair of opposite, like, side wall surfaces, each side wall surface having a concave region and a convex region, said bottom convex surface extending between the inner extremity of each concave region of each said side wall surface, and said convex region of each said side wall extending between said peripheral surface of said sealing rotor and each of said concave regions;

said lugs of said compression rotor being configured of curved surfaces including an outermost or top convex surface and a pair of opposite, like convex side walls having one end intersecting with said top convex surface and an opposite end intersecting with said peripheral surface of said compression rotor, said top convex surface being in sealing engagement with said wall region of said central chamber;

a power impulse assembly comprising:
- a second housing including a second central chamber and third and fourth end chambers located in opposite end regions of said second housing and opening into said central chamber,
- a power impulse rotor mounted on said main shaft within said second central chamber and having a peripheral surface, said power rotor including three equally spaced peripheral lugs, displaced with respect to said lugs of said compression rotor, making a sealing engagement with wall regions of said second central chamber, and said power impulse rotor further including a plurality of evenly spaced peripheral slots opening to one side of said power impulse rotor and being located adjacent to the trailing, with respect to the direction of rotation, edge of each said last-named lug,
- wherein the width of said first central chamber and said compression rotor have a width substantially greater than twice the width of said second central chamber and said power impulse rotor,
- a third sealing rotor mounted on said first auxiliary shaft within said third end chamber and having an outer peripheral surface in sealing engagement with wall regions of said third end chamber, said third sealing rotor including two oppositely positioned slots, a said slot of said third sealing rotor being adapted to mesh with a said lug of said power impulse rotor,
- a fourth sealing rotor mounted on said second auxiliary shaft within said fourth end chamber and having an outer peripheral surface in sealing engagement with wall regions of said fourth end chamber, said fourth sealing rotor including two oppositely positioned slots, a said slot of said fourth sealing rotor being adapted to mesh with a said lug of said power impulse rotor, and
- a first power chamber formed between said third and fourth sealing rotors and between one side of said second housing and said power impulse rotor, and a second power chamber formed between said third and fourth sealing rotors and between the opposite side of said second housing and said power impulse rotor;

wherein said slots in said third and fourth sealing rotors are configured similarly as said slots in said first and second sealing rotors, and said lugs on said power rotor are configured similarly as said lugs on said compression rotor;

said compression rotor being three-halves the diameter of said first and second sealing rotors, and said power impulse rotor being three-halves the diameter of said third and fourth sealing rotors;

timing means for interconnecting said main shaft and said first and second auxiliary shafts and synchronized for engagement of said lugs and slots;

fuel source means comprising a first inlet through said first housing into said first compression chamber adjacent to said first sealing rotor, and a second inlet to said first housing into said second compression chamber adjacent to said second sealing rotor;

gas coupling means comprising a first channel extending from a region of said first compression chamber opposite a circumferential position of said slot in said compression rotor as said compression rotor rotates by said first channel which is adjacent to said second sealing rotor and extending to a region of said second power chamber adjacent to said fourth sealing rotor, and a second channel extending from the region of said second compression chamber opposite the radial position of a said slot in said compression rotor as it rotates past said second channel adjacent to said first sealing rotor to a region of said first power chamber adjacent to said third sealing rotor;

exhaust means comprising a first outlet through said second housing from a region of said first power chamber adjacent to said fourth sealing rotor, and a second outlet through said second housing from a region of said second power chamber adjacent to said third sealing rotor;

said bottom convex surface in both said slots in each of said first and second sealing rotors in said compression assembly defines an arc on a first circle having a radius from the center of each said sealing rotor equal to the value of one-half lug height, RL, subtracted from two-thirds RPC, the radius of the pitch circle of said compression rotor, said two-thirds RPC being RPC' and being the radius of the pitch circle of each said sealing rotor;

said concave regions of said side wall surfaces of both said slots in each of said first and second sealing rotors in said compression assembly defining oppositely positioned arcs on a second circle having a radius equal to the product RL' of RL times a multiplier which has a range from 1 1/16 to 1¾, and said second circle being centered on said pitch circle of each said sealing rotor and overlapping said first circle;

said convex regions of said side wall surfaces of both said slots in each of said first and second sealing rotor in said compression assembly define arcs along third and fourth circles centered on said pitch circle of each of said sealing rotor, and on opposite sides of said second circle, said third circle having a center point spaced a distance equal to the value of the diameter of said second circle, and away from a first point of intersection between said sealing rotor pitch circle and said second circle, and said fourth circle having a center point spaced a distance equal to the diameter of said second circle from a second point of intersection between said sealing rotor pitch circle and said second circle, said convex regions of said side wall surfaces extending along said third and fourth circles, respectively, between said pitch circle and said outer periphery surface of each said sealing rotor;

said top convex surface of each said lug on said compression rotor defining an arc on a fifth circle having a radius from the center of said main shaft equal to the sum of RPC plus RL;

said opposite like convex side walls on each said lug on said compression rotor define opposite arcs on said second circle between said fifth circle and said outer periphery surface of said compression rotor; and said slots in said third and fourth sealing rotors in said power assembly being configured as said slots in said first and second sealing rotors, and said lugs on said power impulse rotor being configured as said lugs on said compression rotor.

* * * * *